May 19, 1953 W. WADE 2,638,624
APPARATUS FOR FORMING, STUFFING, AND SHAPING CASINGS
Filed Sept. 21, 1948
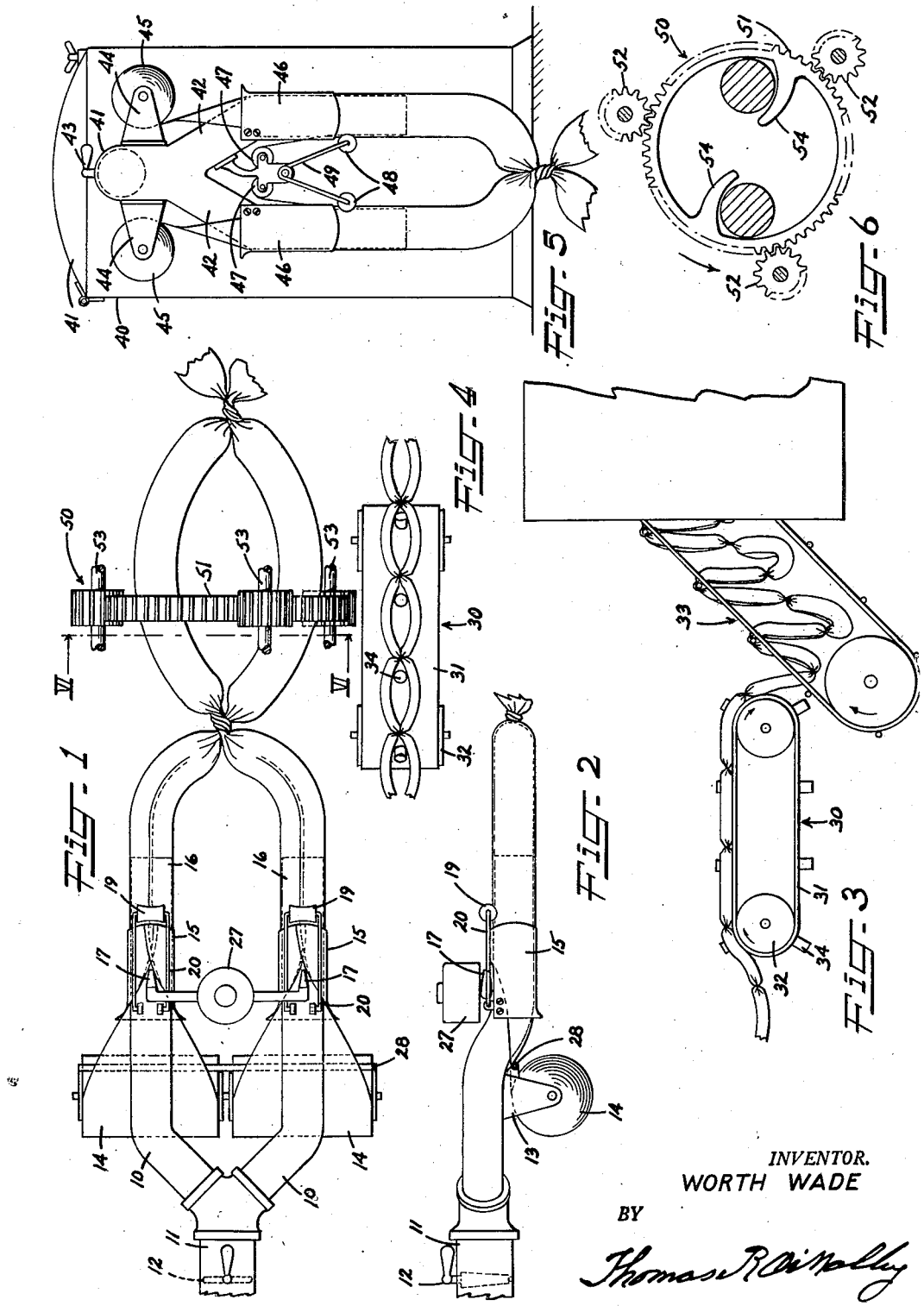
INVENTOR.
WORTH WADE
BY
Thomas R. O'Malley Patented May 19, 1953

2,638,624

UNITED STATES PATENT OFFICE 2,638,624

APPARATUS FOR FORMING, STUFFING, AND SHAPING CASINGS

Worth Wade, Philadelphia, Pa., assignor to American Viscose Corporation, Wilmington, Del., a corporation of Delaware Application September 21, 1948, Serial No. 50,424

3 Claims. (Cl. 17—33)

This invention relates to improvements in apparatus for forming tubular casings and stuffing the casings concurrent with their formation. More particularly, this invention relates to improvements in apparatus for forming tubular casings, stuffing the casings concurrent with their formation, and forming shaped links therein.

In the manufacture of sausages for example, a natural or other pre-formed casing is stuffed with a meat product, and the meat product is displaced from portions of the casing by squeezing and twisting the casing to form links therein. Often two casing members are twisted together after being stuffed to form pairs of links therein. The linked stuffed casing is then subjected to further processing such as smoking, cooking, and the like. The procedures of the prior art were found to be time consuming and with them it was difficult to form sausages in which the links were of uniform length and shape.

This invention has for its principal object to present improvements and advantages to practices found in the prior art.

Another object of the invention is to provide improvements in apparatus whereby tubular casings may be rapidly produced and stuffed and links rapidly and uniformly formed therein.

A further object of this invention is to provide improvements in apparatus whereby a plurality of tubular casings may be rapidly produced and stuffed and associated together to form uniform shaped links therein.

Other objects and advantages of the invention will be apparent from the following description and the accompanying drawing.

In the drawing,

Figure 1 is a plan view of a form of apparatus for forming, stuffing, and forming links in the stuffed tubular casings.

Figure 2 is an elevational view of the form of apparatus shown in Figure 1.

Figure 3 is an elevational view of means for withdrawing and shaping linked stuffed casings from the forming and stuffing unit and for supporting and conveying the casings during further treatment thereof.

Figure 4 is a plan view of the means for withdrawing and shaping the linked stuffed casings from the forming and stuffing unit.

Figure 5 is an elevational view of another form of apparatus for forming and stuffing tubular casings.

Figure 6 is a sectional view of the section being taken on the line VI—VI in Figure 1 of means for forming links in stuffed casings.

This invention in general comprises forming tubular casing members by overlapping the edges of strips of sheet material around the nozzles of a sausage stuffing machine which nozzles are positioned relatively close together and extend in the same direction, and sealing the overlapped edges of the sheet material. Concurrent with their formation the casing members are stuffed with meat or the like and the stuffed casings after passing a short distance off the nozzles are twisted together to displace the stuffing in portions of the casings and form links therein. The pressure of the stuffing entering a casing assists in pushing the casing off of the nozzle thereby continually presenting sheet material to be formed into the casing and casing to be stuffed. The links are formed by means for twisting together at intervals, stuffed casings and additional means are provided for drawing the casings from the nozzles comprising conveyor means which also serve to shape and retain the links in the casings twisted together.

The nozzle members are positioned apart a short distance which distance is of the order of the length of the links that are desired so that by uniformly twisting the stuffed casings as they pass off the nozzles, links are formed therein which are relatively short and are of uniform length.

In accordance with this invention, the casings may be made of any suitable form of sheet material that is sufficiently flexible, permeable, and strong to be formed into tubular casings and stuffed and thereafter subjected to desired treatments like cooking and smoking. Such materials as paper, regenerated cellulose, cellulose acetate, denitrated cellulose nitrate, cellulose ethers, resins, including thermoplastic resins, for example vinyl resins, have been found satisfactory. Any means for joining the edges of the sheet material together to form the tube may be employed which results in a secure bond. Such means include the use of various adhesives, solvents for the sheet material, and the use of heat where the material is thermoplastic. Where an adhesive is used, the adhesive may be applied either in the form of a liquid or as a pre-formed dry adhesive, such as a ribbon or thread of adhesive material, or adhesive material may be applied to the sheet material adjacent one edge and dried before the sheet material is used.

Referring to Figures 1 to 4 of the drawing in which is shown a form of apparatus embodying the invention, reference character 10 indicates a pair of nozzles that are connected to the outlet pipe 11 of a conventional sausage meat container. The nozzles which extend substantially parallel and in the same horizontal direction are positioned relatively close together, a distance the order of the length of the links it is desired to produce. The meat in the container is maintained under pressure and a valve means 12 is positioned in the outlet pipe to control the flow of meat from the container to the nozzles. The cross section of the outlet pipe is equal to the sum of the cross sections of the two nozzles so that the pressure in the outlet pipe and in the nozzles is maintained uniform. On the underside of each of the nozzles is mounted a bracket 13 on which are rotatably supported in axial alignment rolls of casing forming sheet material 14. Tube formers 15 encircle each of the nozzles and are arranged to shape the sheet material delivered from the rolls into tubes 16 about the nozzles. There is mounted between the nozzles a liquid reservoir 27 for adhesive or solvent for the sheet material. The reservoir is provided with outlet means 17 for directing liquid between overlapping portions of the sheet material on the nozzles to join those portions together and form seams in the tubular casings. Arcuate rolls or shoes 19 heated by electric means or the like are supported by the spring members 20 and positioned to apply heat and pressure to the seams in the tubular casings formed on the nozzles.

It is desirable to feed the sheet material in such a position that the center and the edges of the sheet are displaced an equal distance from the longitudinal axis of the nozzle. This is done according to the embodiment of the invention shown by forming each nozzle with a reversed curve in the end adjacent to the meat container. Guide rollers 28 are positioned adjacent each of the nozzles with the upper surface of each in the same plane with the axis of the free end of the adjacent nozzle. When the roll of sheet material is passed over a roller it is approximately at the same level as the center of the nozzle and is suitably positioned for the formation of the tube. It is to be understood that either or both of the nozzles may be reversed in which case the roll of sheet material for the nozzle that has been reversed is positioned on the top side of that nozzle and the adhesive applying means and the seam pressing means are positioned adjacent the underside of that nozzle.

In the operation of this embodiment of the invention sheet material is passed over the guide rollers, through the forming means and shaped into a continuous tubing on each of the nozzles with overlapping edges to form a seam. Adhesive material is positioned between the overlapping edges and the portions to which the adhesive material has been applied are then pressed together and subjected to heat. The seamed tubing is passed beyond the ends of the nozzles and is tied. Sausage meat or other stuffing is then continuously introduced into each of the casings through the nozzle members concurrently with the formation of the casing members. The pressure of the sausage meat in the casing members assists in drawing the casing members over the nozzles.

Links are formed in the stuffed casings by displacing the stuffing and twisting the casings around each other at spaced intervals. As the ends of the nozzles are spaced close together and the stuffed casings pass from the nozzles at a uniform rate, by twisting the stuffed casings around one another at regular intervals, links will be formed therein that are of uniform length. The means for forming the links in the stuffed casings as shown in Figures 1 and 6 of the drawing and indicated generally by reference character 50 comprises an annular external gear like member 51 that is rotatably supported and positively driven in the direction shown by the arrow in Figure 6 by the gear members 52 in mesh therewith. The gear members 52 are mounted on the shafts 53 which are driven by suitable means that are not shown. The annular gear like member is provided with circumferentially spaced inwardly extending arcuate stuffed casing engaging finger-like members 54. The inner diameter of the annular member is approximately equal to the distance between the center lines of the nozzle member plus one-half the diameter of each of them. The arcuate finger-like members extend inwardly only part way across the annular member leaving a clear and unobstructed space in the center of the annular member. As the stuffed casings pass from the nozzle members through the annular member, the finger-like members engage the stuffed casings and twist them about one another displacing the stuffing in portions of the casings and forming links therein. The speed of rotation of the annular member is so related to the speed at which the stuffed casings are delivered from the nozzle members that the stuffed casings may be twisted about one another and links of uniform predetermined length are formed. The free and unobstructed space at the center of the annular member enables the portions of the casings that are twisted together to pass freely through the center of the annular member. The linked casings then are presented to the conveyor-like member 30 comprising a continuous belt means 31 passing over the positively driven rollers 32. The belt-like member is provided with outwardly extending circular studs or posts 34 that are uniformly spaced apart. The links of the stuffed casings are positioned over the studs which convey the links away from the nozzles to the conveyor mechanism 33. The conveyor 33 is a chain-like mechanism comprising rods on which the links may be festooned and conducted through smoking and cooking chambers. The stud-like members on the conveyor 31 being circular in cross section assist in shaping the links to a desired curved formation while preventing the links from untwisting.

In Figure 5 of the drawings is shown another form of apparatus embodying the invention. The apparatus as shown comprises a meat or other stuffing container 40 which is provided with a removable cover and means not shown for maintaining the meat in the container under pressure. The container is provided with an outlet 41 to which is secured two nozzle members 42 that extend downwardly in a vertical direction. The nozzles are substantially parallel and are positioned relatively close together. The cross sectional area of the outlet pipe is equal to the sum of the cross sectional areas of the nozzles. Valve means 43 is provided in the outlet pipe to control the flow of meat or other stuffing from the container. On opposite sides of the outlet pipe are positioned brackets 44 on each of which is mounted a roll of casing forming sheet material 45. On each nozzle there is mounted a tube former 46 which encircles the nozzle and is arranged to shape sheet material into a tubular casing about the nozzle. The nozzles are of the same shape as those shown in Figures 1 and 2 and the sheet material is of the same type and is presented to the nozzles in the same manner as described above. Rolls 47 of pre-formed adhesive material such as a ribbon or thread of resin are mounted adjacent each of the nozzles and positioned so that the adhesive material may be directed between overlapping portions of the sheet material on the nozzles. Arcuate rollers or shoes 48 heated by electric means or the like are supported on spring members 49 and positioned to apply heat and pressure to overlapping portions of the sheet material between which the adhesive has been applied. This embodiment of the invention operates in substantially the same manner as the form of device shown in Figures 1 and 2, the only difference being in the direction the nozzles extend and in the use of pre-formed adhesive.

While preferred embodiments of the invention have been shown and described, it is to be understood that changes and variations may be made therein without departing from the spirit and scope of the invention as defined in the appended claims.

What I claim is:

1. Apparatus for forming stuffed casings and for forming links therein comprising a pair of substantially parallel extrusion nozzles extending in the same direction, means adjacent the discharge end of the nozzles comprising an annular rotatable member for twisting a pair of stuffed casings formed at the nozzles, together at spaced intervals to form links therein, the axis of the rotatable member extending in the same direction and between the nozzles, the annular rotatable member having inwardly extending casing-engaging fingers and a free and unobstructed center portion.

2. Apparatus for forming stuffed casings and for forming shaped links therein comprising a pair of substantially parallel extrusion nozzles extending in the same direction, means adjacent the discharge end of the nozzles for twisting a pair of stuffed casings formed at the nozzles together at spaced intervals to form links therein comprising an annular rotatable member the axis of which extends in the same direction and between the nozzles, said annular rotatable member having inwardly extending casing-engaging fingers and a free and unobstructed center portion, and conveyor-like means adjacent the twisting means having outwardly projecting portions that are movable in a path extending between the nozzles in the direction the nozzles extend to engage twisted portions of adjacent stuffed casings to draw the stuffed casings through the twisting means and for shaping the link formed therein.

3. Apparatus for forming stuffed casings and for forming links therein comprising a pair of substantially parallel extrusion nozzles extending in the same direction, means adjacent the discharge end of the nozzles comprising an annular rotatable member for twisting a pair of stuffed casings formed at the nozzles, together at spaced intervals to form links therein, the axis of the rotatable member extending in the same direction and between the nozzles, the annular rotatable member having inwardly extending casing-engaging fingers and a free end unobstructed center portion, the inner diameter of the annular member being approximately equal to the distance between the center lines of the nozzle members plus one-half the diameter of each of them.

WORTH WADE.

References Cited in the file of this patent

UNITED STATES PATENTS

| Number | Name | Date |
| --- | --- | --- |
| 854,044 | Kuersten | May 21, 1907 |
| 1,361,094 | Pappazoglidis et al. | Dec. 7, 1920 |
| 1,654,871 | Gage et al. | Jan. 3, 1928 |
| 2,234,054 | Mason | Mar. 4, 1941 |
| 2,282,666 | McCue | May 12, 1942 |